(12) United States Patent
Baran (10) Patent No.: US 7,721,549 B2
(45) Date of Patent: May 25, 2010

(54) FAN VARIABLE AREA NOZZLE FOR A GAS TURBINE ENGINE FAN NACELLE WITH CAM DRIVE RING ACTUATION SYSTEM

(75) Inventor: Kenneth C. Baran, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 764 days.

(21) Appl. No.: 11/672,589

(22) Filed: Feb. 8, 2007

(65) Prior Publication Data

US 2008/0190095 A1 Aug. 14, 2008

(51) Int. Cl.
*F02K 1/00* (2006.01)

(52) U.S. Cl. .................. 60/770; 60/226.1; 239/265.19; 244/53 R (58) Field of Classification Search .............. 60/226.1, 60/262, 226.3, 770, 771; 239/265.19, 265.33, 239/265.39; 244/53 R, 53 B
See application file for complete search history.

(56) References Cited

U.S. PATENT DOCUMENTS

| | | | | | |
|---|---|---|---|---|---|
| 3,484,847 | A | * | 12/1969 | Poole | 60/226.2 |
| 4,068,469 | A | * | 1/1978 | Adamson | 60/204 |
| 4,132,068 | A | * | 1/1979 | Johnston | 60/226.2 |
| 4,327,548 | A | * | 5/1982 | Woodward | 60/226.2 |
| 4,409,788 | A | * | 10/1983 | Nash et al. | 60/226.3 |
| 5,082,182 | A | * | 1/1992 | Bruchez et al. | 239/265.35 |
| 5,107,675 | A | * | 4/1992 | Roberts | 60/226.1 |
| 5,120,005 | A | * | 6/1992 | Reedy | 244/113 |
| 5,150,839 | A | * | 9/1992 | Reedy | 239/265.41 |
| 5,201,800 | A | * | 4/1993 | Wolf | 60/204 |
| 5,261,605 | A | * | 11/1993 | McLafferty et al. | 239/265.35 |
| 5,329,763 | A | * | 7/1994 | Ibarreche Mendia et al. | 239/265.35 |
| 5,359,851 | A | * | 11/1994 | Bannerot et al. | 60/771 |
| 5,485,959 | A | * | 1/1996 | Wood et al. | 239/265.41 |
| 5,779,152 | A | * | 7/1998 | Renggli et al. | 239/265.33 |
| 5,833,140 | A | * | 11/1998 | Loffredo et al. | 239/265.37 |
| 6,067,793 | A | * | 5/2000 | Urruela et al. | 60/230 |
| 6,102,307 | A | * | 8/2000 | Elorriaga et al. | 239/265.39 |
| 6,148,608 | A | * | 11/2000 | Martin et al. | 60/232 |
| 6,212,877 | B1 | * | 4/2001 | Renggli | 60/232 |
| 6,318,070 | B1 | | 11/2001 | Rey et al. | |
| 6,360,527 | B1 | * | 3/2002 | Feder et al. | 60/232 |
| 6,415,599 | B1 | * | 7/2002 | Ausdenmoore et al. | 60/230 |
| 6,439,840 | B1 | | 8/2002 | Tse | |
| 6,505,706 | B2 | | 1/2003 | Tse | |

(Continued)

*Primary Examiner*—William H Rodríguez
(74) *Attorney, Agent, or Firm*—Carlson Gaskey & Olds PC (57) ABSTRACT

A fan variable area nozzle (FVAN) includes a flap assembly which varies a fan nozzle exit area through a cam drive ring. The flap assembly generally includes a multiple of flaps, flap linkages and an actuator system. The actuator system rotationally translates the cam drive ring relative an engine centerline axis which results in a follower of the flap linkage following a cam surface to pivot each flap such that the flap assembly dilates about the circumferential hinge line. Rotation of the cam drive ring adjusts dilation of the entire fan nozzle exit area in a symmetrical manner. Another cam drive ring includes a multiple of movable cams which engages the follower of the flap linkage of each flap such that pivotable movement of a particular number of the multiple of movable cams about a respective cam pivot results in vectoring of the FVAN.

19 Claims, 7 Drawing Sheets

U.S. PATENT DOCUMENTS

| | | |
|---|---|---|
| 6,543,224 B1 | 4/2003 | Barooah |
| 6,640,537 B2 | 11/2003 | Tse |
| 6,718,752 B2 | 4/2004 | Nesbitt et al. |
| 6,748,744 B2 | 6/2004 | Peplow et al. |
| 6,813,877 B2 | 11/2004 | Birch et al. |
| 6,966,175 B2 * | 11/2005 | Lair .......... 60/226.1 |
| 7,000,378 B2 | 2/2006 | Birch et al. |
| 7,013,650 B2 * | 3/2006 | Mandet .......... 60/771 |
| 7,043,898 B2 | 5/2006 | Rago |
| 7,055,329 B2 | 6/2006 | Martens et al. |
| 7,093,423 B2 | 8/2006 | Gowda et al. |
| 7,093,793 B2 * | 8/2006 | Lair .......... 244/53 R |

\* cited by examiner

| CIRC LOC | EXAMPLE LINK TRANSLATION | EXAMPLE FLAP ROTATION |
| --- | --- | --- |
| 0° | FWD, E.G. + 5 UNITS | +x° |
| 45 | FWD 2.5 UNITS | +ax° (o<a<1) |
| 90 | NONE (0 UNITS) | NONE |
| 135 | AFT −2.5 UNITS | −ax° (o<a<1) |
| 180 | AFT −5 UNITS | −x° |
| 225 | AFT −2.5 UNITS | −ax° (o<a<1) |
| 270 | NONE (0 UNITS) | NONE |
| 315 | FORWARD 2.5 UNITS | +ax° (o<a<1) |

FAN VARIABLE AREA NOZZLE FOR A GAS TURBINE ENGINE FAN NACELLE WITH CAM DRIVE RING ACTUATION SYSTEM

BACKGROUND OF THE INVENTION

The present invention relates to a gas turbine engine, and more particularly to a turbofan engine having an axial and rotationally moveable drive ring to provide symmetrical and asymmetrical control of the fan nozzle exit area and the direction of the engine thrust vector.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between an outer fan nacelle and an inner core nacelle. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzles provide a smaller fan exit nozzle area during cruise conditions and a larger fan exit nozzle area during take-off and landing conditions. Existing fan variable area nozzles typically utilize relatively complex mechanisms that increase overall engine weight to the extent that the increased fuel efficiency therefrom may be negated.

Accordingly, it is desirable to provide an effective, lightweight fan variable area nozzle with thrust vectoring capability for a gas turbine engine.

SUMMARY OF THE INVENTION

A fan variable area nozzle (FVAN) according to the present invention includes a flap assembly which varies a fan nozzle exit area. The flap assembly is incorporated into an end segment of the fan nacelle to include a trailing edge thereof.

The flap assembly generally includes a multiple of flaps, flap linkages and an actuator system. The actuator system rotationally translates a cam drive ring which drives the flap linkage of each flap to symmetrically vary the fan nozzle exit area.

In operation, a multiple of actuators rotate the cam drive ring which results in a follower of the flap linkage following a cam surface to pivot each flap such that the FVAN symmetrically dilates. Rotation of the cam drive ring adjusts dilation of the entire fan nozzle exit area in a symmetrical manner.

In another embodiment, the cam drive ring includes a multiple of movable cams which engages the follower of the flap linkage of each flap. Pivoting of a particular number of the multiple of movable cams results in vectoring of the FVAN.

The present invention therefore provides an effective, lightweight fan variable area nozzle and thrust vectoring system for a gas turbine engine.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1A:
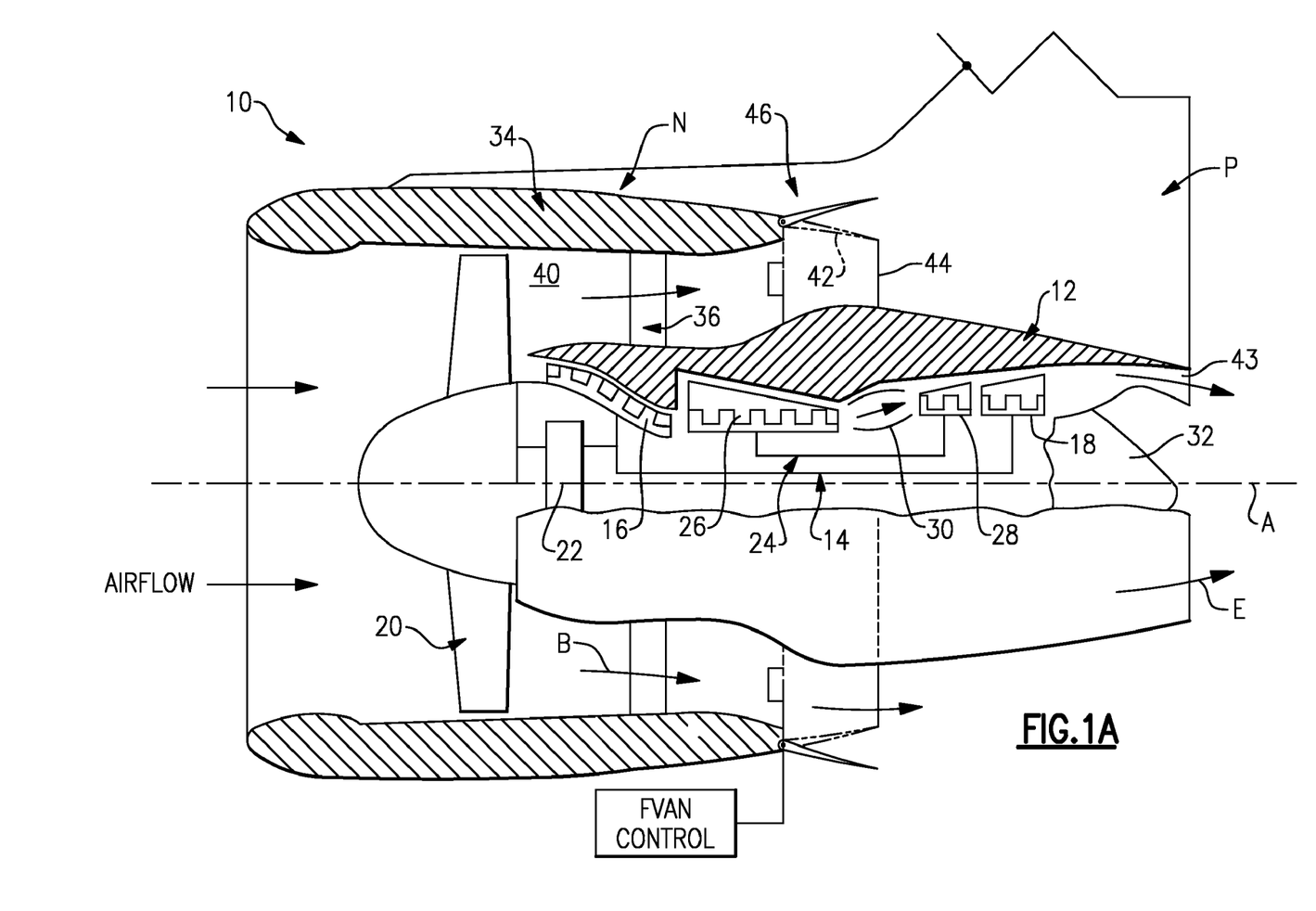
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. In the illustrated engine architecture, which is referred to as a geared turbofan, the low spool 14 drives a fan 20 through a gear train 22. The high spool 24 includes a high pressure compressor 26 and high pressure turbine 28. A combustor 30 resides between the high pressure compressor 26 and high pressure turbine 28. The low and high spools 14, 24 rotate independently about an engine axis of rotation A.

The engine 10 is preferably a high-bypass geared turbofan aircraft engine. Preferably, the engine 10 bypass ratio is greater than ten (10), the turbofan diameter is significantly larger than that of the low pressure compressor 16, and the low pressure turbine 18 has a pressure ratio that is greater than five (5). The gear train 22 is preferably an epicycle gear train such as a planetary gear system or other gear system with a gear reduction ratio of greater than 2.5. It should be understood, however, that the above parameters are only exemplary of a disclosed geared turbofan engine and that the present invention is likewise applicable to other gas turbine engines including direct drive fans in which the fan is directly coupled to the low spool.

Airflow enters a fan nacelle 34, which circumscribes the core nacelle 12 along at least part of its length. The fan 20 communicates airflow into the core engine for compression by the low pressure compressor 16 and the high pressure compressor 26. Core airflow compressed by the low pressure compressor 16 and the high pressure compressor 26 is mixed with the fuel in the combustor 30 and ignited. The resultant combustion products expand through the high pressure turbine 28 and low pressure turbine 18. The turbines 28, 18 are coupled for rotation with, respective, spools 24, 14 to rotationally drive the compressors 26, 16 and through the gear train 22, the fan 20 in response to the expansion. A core engine exhaust flow E exits the core nacelle 12 through a core nozzle 43 defined between the core nacelle 12 and a tail cone 32.

Figure 1B:
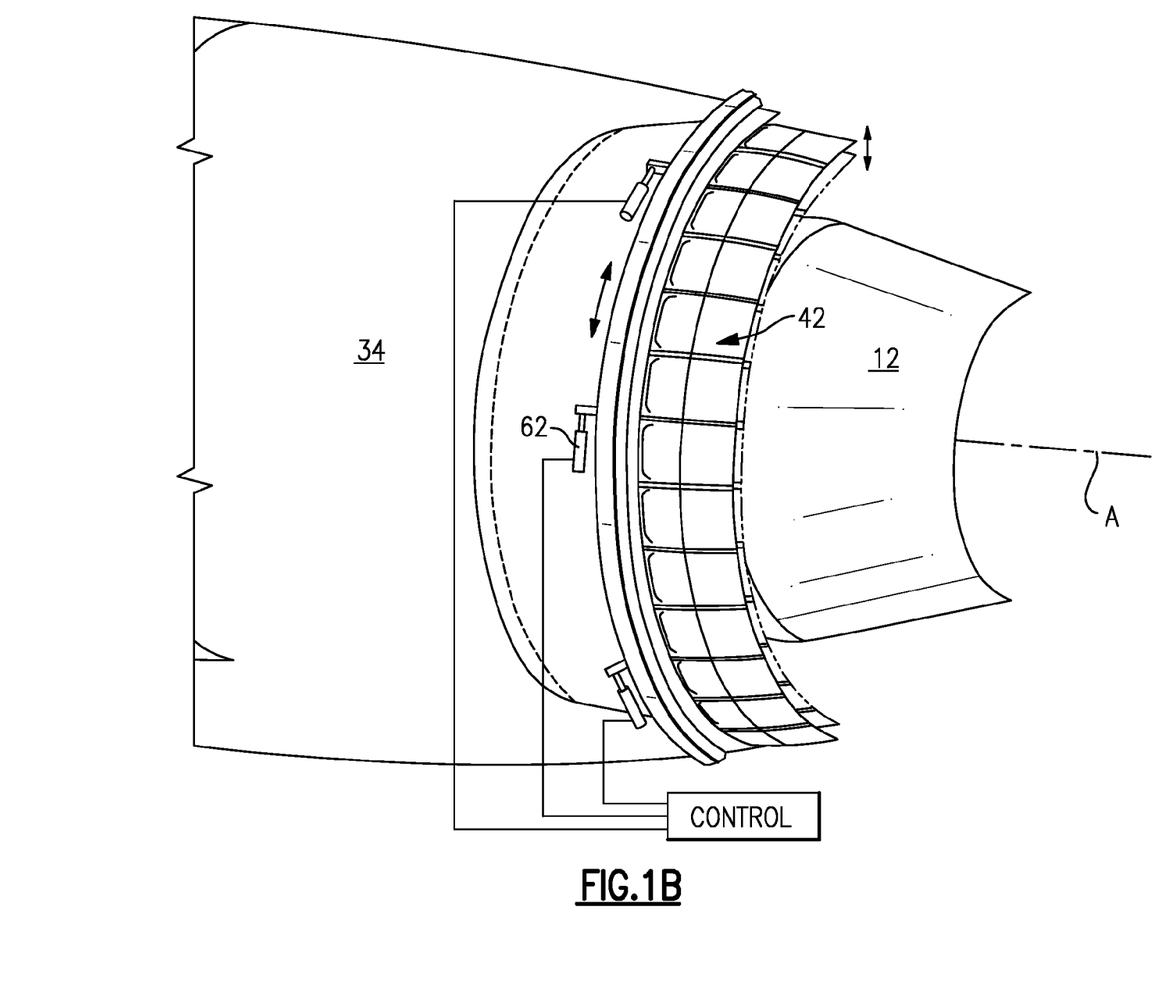
FIG. 1B is a perspective partial fragmentary view of the engine.

The core nacelle 12 is supported within the fan nacelle 34 by structure 36 often generically referred to as an upper and lower bifurcation. A bypass flow path 40 is defined rotationally between the core nacelle 12 and the fan nacelle 34. The engine 10 is a high bypass engine in which approximately 80 percent of the airflow entering the fan nacelle 34 is bypass flow B that enters the bypass flow path 40 rather than the core airflow. The bypass flow B communicates through the generally annular bypass flow path 40 and is discharged from the engine 10 through a fan variable area nozzle (FVAN) 42 (also illustrated in FIG. 1B) which defines a fan nozzle exit area 44 between the fan nacelle 34 and the core nacelle 12.

Thrust is a function of density, velocity, and area. One or more of these parameters can be manipulated to vary the amount and direction of thrust provided by the bypass flow B. The FVAN 42 changes the physical area and geometry to manipulate the thrust provided by the bypass flow B. However, it should be understood that the fan nozzle exit area 44 may be effectively altered by methods other than structural changes, for example, by altering the boundary layer. Furthermore, it should be understood that effectively altering the fan nozzle exit area 44 is not limited to physical locations proximate the exit of the fan nacelle 34, but rather, may include the alteration of the bypass flow B at other locations.

The FVAN 42 defines the fan nozzle exit area 44 for axially discharging the fan bypass flow B pressurized by the upstream fan 20. A significant amount of thrust is provided by the bypass flow B due to the high bypass ratio. The fan 20 of the engine 10 is preferably designed for a particular flight condition—typically cruise at approximately 0.8M and 35,000 feet.

Because the fan 20 is designed for efficiency at the cruise condition, the FVAN 42 is operated to vary the fan nozzle exit area 44 for efficient engine operation at other flight conditions, such as landing and takeoff and to meet other operational parameters such as noise level. Preferably, the FVAN 42 defines a nominal converged cruise position for the fan nozzle exit area 44 and rotationally opens relative thereto to define a diverged position for other flight conditions. The FVAN 42 preferably provides an approximately 20% (twenty percent) change in the fan nozzle exit area 44. It should be understood that other arrangements as well as essentially infinite intermediate positions as well as thrust vectored positions in which some circumferential sectors of the FVAN 42 are converged or diverged relative to other circumferential sectors are likewise usable with the present invention.

In operation, the FVAN 42 communicates with a controller C or the like to adjust the fan nozzle exit area 44 in a symmetrical and asymmetrical manner. Other control systems including an engine controller or flight control system may likewise be usable with the present invention. By adjusting the entire periphery of the FVAN 42 symmetrically in which all sectors are moved uniformly, thrust efficiency and fuel economy are maximized during each flight condition. By separately adjusting each flap 50 of the FVAN 42 to provide an asymmetrical fan nozzle exit area 44, engine fan bypass flow is selectively vectored to provide, for example only, trim balance, thrust controlled maneuvering, enhanced ground operations and short field performance.

Figure 2:
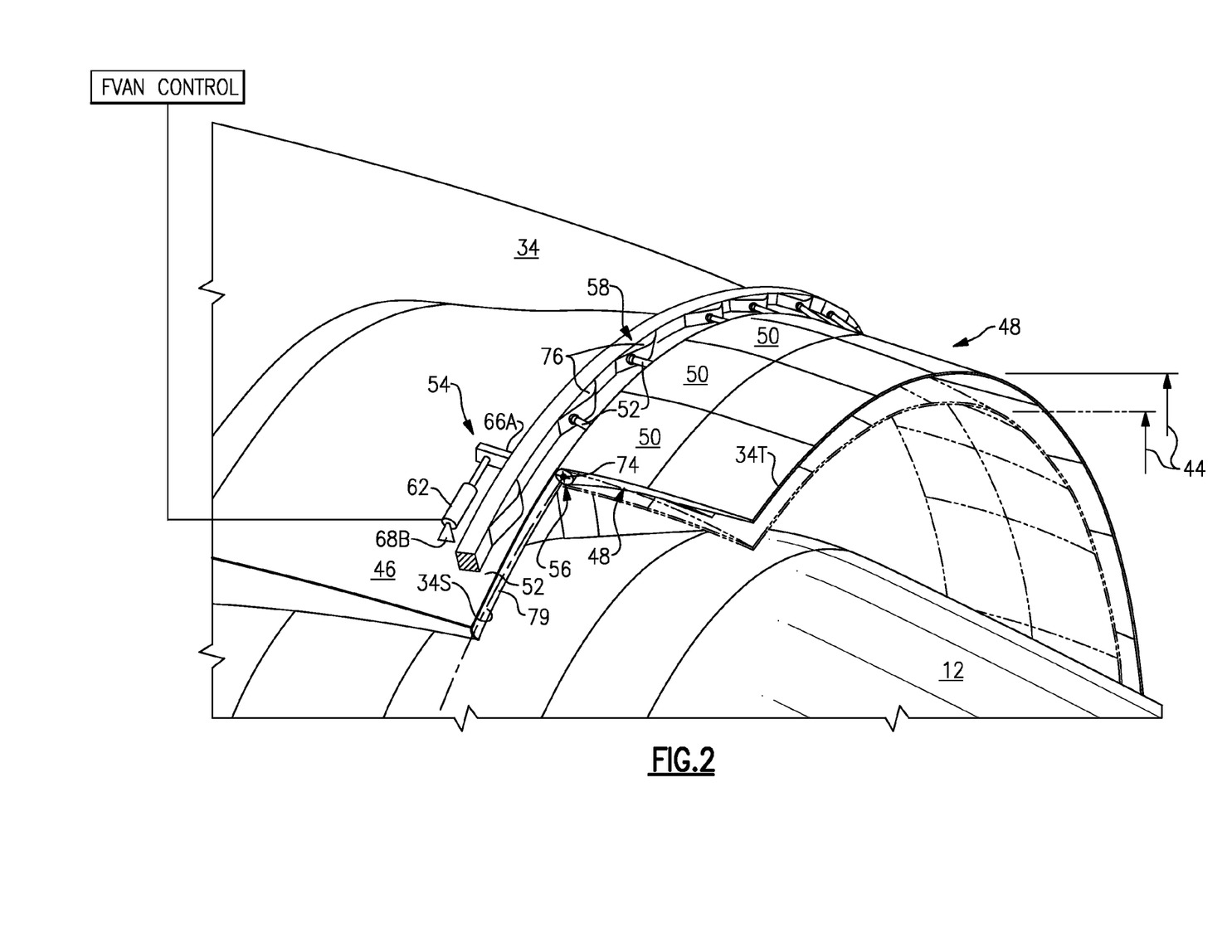
FIG. 2 is a partial perspective view of the FVAN.

Referring to FIG. 2, the FVAN 42 generally includes a flap assembly 48 which varies the fan nozzle exit area 44. The flap assembly 48 is preferably incorporated into the fan nacelle 34 to define a trailing edge 34T thereof. The flap assembly 48 generally includes a multiple of flaps 50, a respective multiple of flap linkages 52 and an actuator system 54.

The actuator system 54 includes a multiple of actuators 62 which are mounted to or adjacent a fixed structure such as the fan nacelle 34. Each actuator 62 is mounted to a cam drive ring 58 at a respective pivotable actuator attachment 66A. Each actuator 62 is also mounted to the fan nacelle 34 at a respective pivotable actuator attachment 66B. The multiple of actuators 62 operate in response to the controller C to rotationally position the cam drive ring 58 relative the engine axis A to vary the fan nozzle exit area 44 defined by the FVAN 42 through which the fan air B is discharged.

Each flap 50 is pivotably mounted to the fan nacelle 34 through a hinge 56. The flap 50 is linked to the cam drive ring 58 through the respective flap linkage 52 which is biased into contact with the cam drive ring 58. The flap linkage 52 extends between the flap 50 and the cam drive ring 58 to move the flap 50 relative a fan nacelle segment 34S about a hinge line 74 defined by the hinge 56. The hinge line 74 is defined about the circumference of the FVAN 42. Each hinge 56 may include bearings, bushings or flexures as generally understood. Each flap 50 may also include a follower seal arrangement such that each flap 50 engages and overlaps an adjacent flap 50 to provide an overlapping flap-seal circumferential follower seal for asymmetrical operation.

Figure 3A:
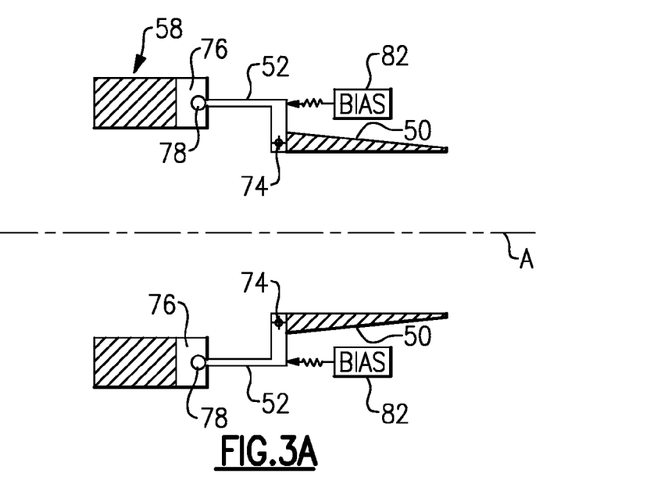
FIG. 3A is a schematic longitudinal sectional view of the FVAN.
Figure 3B:
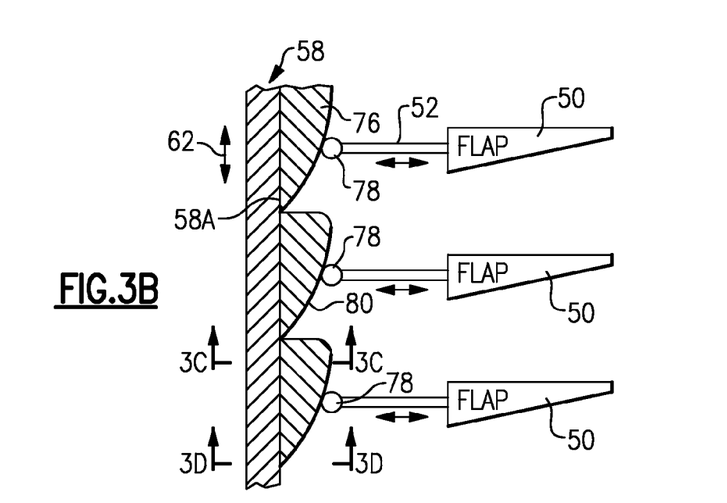
FIG. 3B is a schematic view of the cam drive ring.
Figure 4:
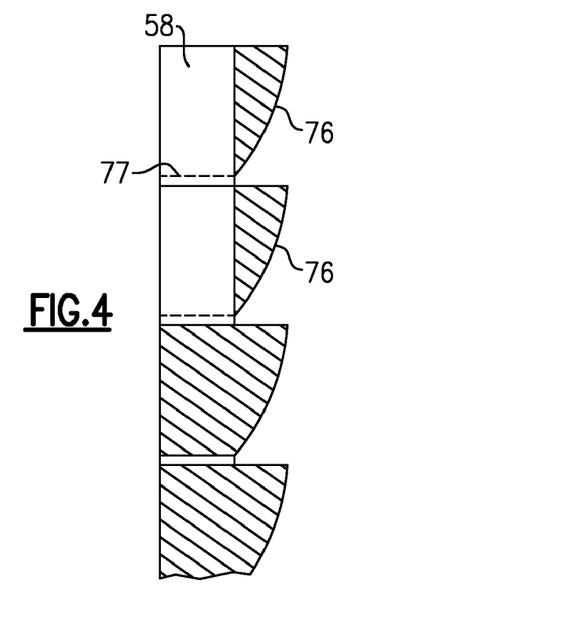
FIG. 4 is a schematic fragmentary view of another cam drive ring.

Referring to FIG. 3A, the cam drive ring 58 includes a multiple of cams 76 (FIG. 3B) along an aft surface 58A. The multiple of cams 76 may be manufactured directly into the cam drive ring 58 or may be removable components which are inserted into openings 77 (FIG. 4) of a generally annular ring to facilitate manufacture and repair.

Each of the multiple of cams 76 engages the flap linkage 52 of each flap 50 in a biased abutting relationship. The flap linkage 52 includes an follower 78 such as a ball, roller, bearing, sliding, rolling or such like interface which is biased into contact with each of the multiple of cams 76 along a cam surface 80. That is, the flap linkage 52 is biased through a bias member 82 (illustrated schematically) to maintain contact with the associated cam surface 80. The follower 78 provides minimal friction between the flap linkage 52 and the associated cam 76 such that the follower 78 rides along the cam surface 80 of the cam 76 in response to rotation of the cam drive ring 58.

Figure 3C:
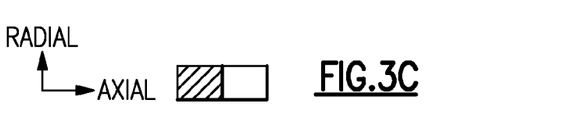
FIG. 3C is a sectional view of a cam in the cam drive ring taken along line 3C-3C in FIG. 3A.
Figure 3D:
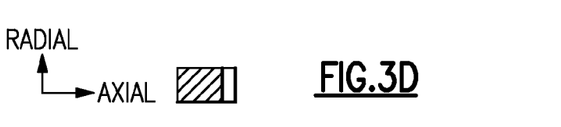
FIG. 3D is a sectional view of the cam in the cam drive ring taken along line 3D-3D in FIG. 3A.

The flap linkage 52 is biased to maintain contact between each follower 78 of each flap 50 and each of the multiple of cam surfaces 80 (FIGS. 3C, 3D). It should be understood that the flap linkage 52 and the bias member 82 are illustrated schematically as various arrangements may be utilized with the present invention.

In operation, the multiple of actuators 62 rotate the cam drive ring 58 about the longitudinal engine axis A. Rotation of the cam drive ring 58 results in the follower 78 following the cam surface 80 to pivot each flap 50, through the flap linkage 52, such that the flap assembly 48 pivots about the circumferential hinge line 74. Rotation of the cam drive ring 58 adjusts the entire fan nozzle exit area 44 in a symmetrical manner.

Figure 5A:
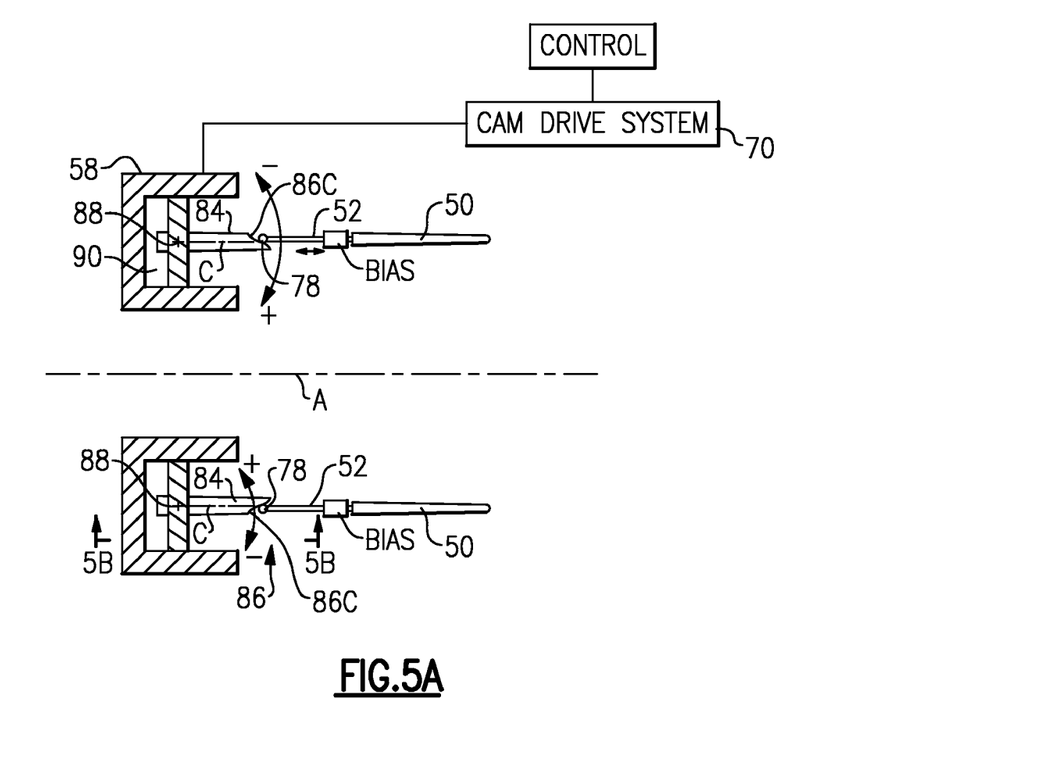
FIG. 5A is a sectional view of another embodiment of the cam drive ring.

Referring to FIG. 5A, another cam drive ring 58' includes a multiple of movable cams 84 which, like cams 76, extend from the cam drive ring 58'. In addition, each of the multiple of movable cams 84 pivots about a cam pivot 88 defined in the cam drive ring 58'. Each follower 78 of each flap linkage 52 engages a cam surface 86 of each of the movable cams 84 in a biased abutting relationship as described above.

Figure 5B:
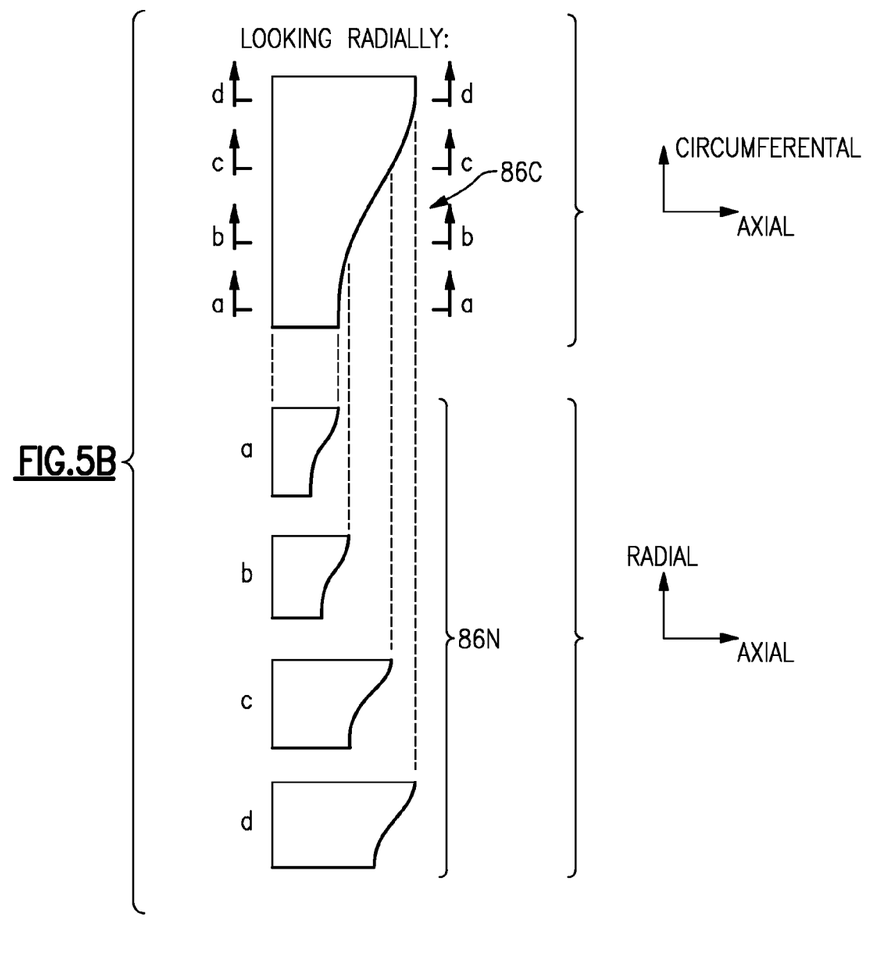
FIG. 5B is a schematic view of the cam drive ring illustrating a normal cam surface.

The cam surface 86 is preferably a compound cam surface which defines a circumferential cam profile 86C in a circumferential direction (FIG. 5A) and a normal cam profile 86N (FIG. 5B) in a direction normal to the flap 50. Rotation of the cam drive ring 58' results in the follower 78 following the cam surface 86C along the circumferential direction to pivot each flap 50, through the flap linkage 52 such that the flap assembly 48 dilates about the circumferential hinge line 74. Rotation of the cam drive ring 58' adjusts the fan nozzle exit area 44 in a symmetrical manner.

Figure 6:
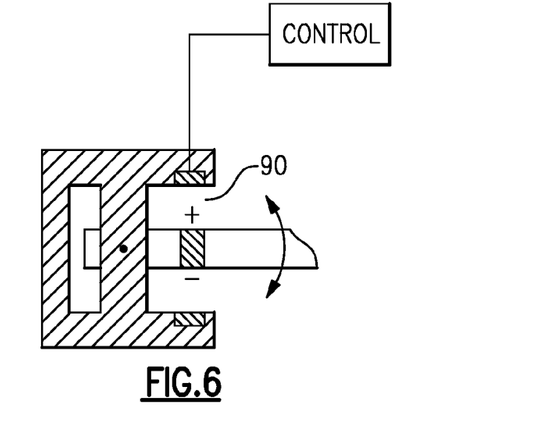
FIG. 6 is a schematic of the cam drive ring illustrating a moveable cam drive system.

Pivoting of a particular number of the multiple of movable cams 84 about each of their respective cam pivot 88 results in vectoring of the FVAN 42. That is, each of the multiple of movable cams 84 is selectively pivotable about the cam pivot 88 off a baseline cam axis C generally perpendicular to the cam drive ring 58' in response to a cam drive system 90. Various drive systems 90 may be utilized herein including, for example only, a magnetic system (FIG. 6) which selectively positions the movable cams 84 relative the movable baseline cam axis C. It should be understood that various other electromechanical drive systems may be utilized with the present invention.

As defined herein, movement of the movable cams 84 toward the engine axis A is positive (+) movement while movement of the movable cams 84 away from the engine axis A is negative (−) movement. Movement of the movable cams 84 in the positive direction results in opening of the flap 50 from a baseline position while negative movement of the movable cams 84 results in closing of the flap 50 toward the engine axis A from a baseline position. In other words, rotational movement of the movable cams 84 relates to vectoring of the FVAN 42. For example only, if all the movable cams 84 were moved in the same direction (+ or −) and through the same angle, the result would be symmetric variation of the nozzle area without any change in the direction of the thrust vector—which is generally the same as just rotation of the cam drive ring 58' about the axis A with the movable cams 84 maintained in a fixed position.

Figure 5C:
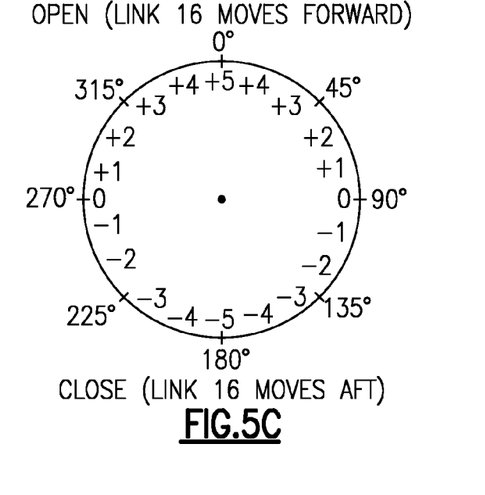
FIG. 5C is a graphical representation of a FVAN "up" operation.
Figure 5D:
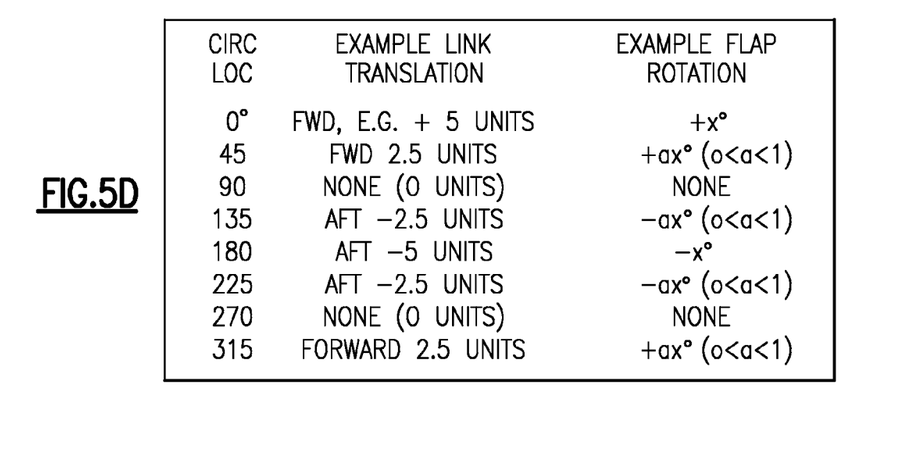
FIG. 5D is a table of the cam drive ring in a rotationally translated "upward" position.
Figure 7A:
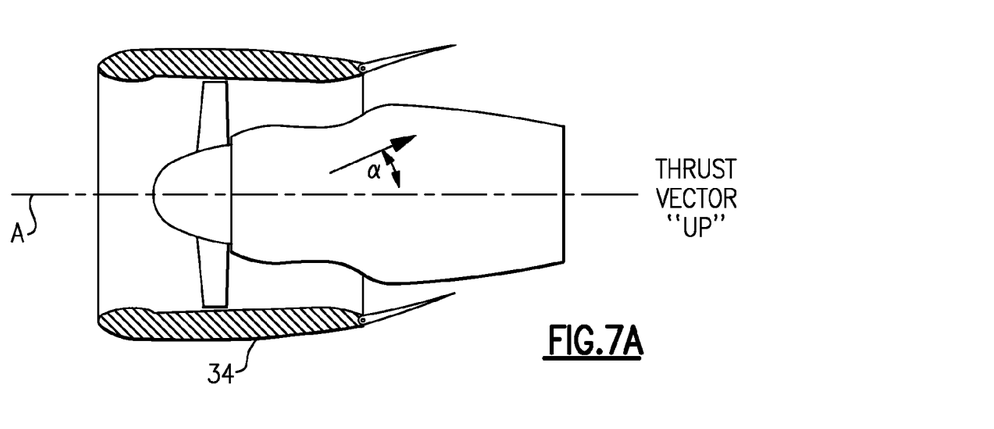
FIG. 7A is a schematic view of the FVAN in response to the movable cams positioned to vector thrust in an "upward" direction.
Figure 7B:
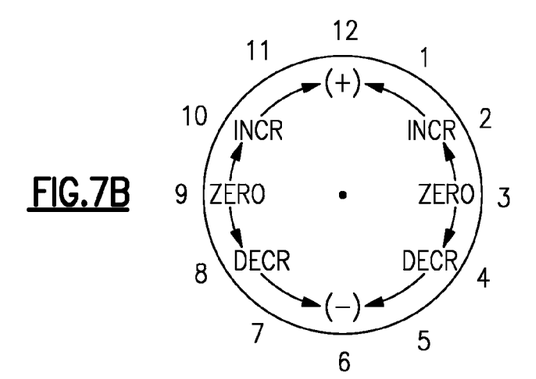
FIG. 7B is a graphical representation of the FVAN in response to the movable cams positioned to vector thrust in an "upward" direction.

Conversely, movement of the movable cams 84 at the 0 degree position in the (+) direction and the movable cams 84 at the 180 degree position in the (−) direction will open the upper sector of the FVAN 42 while the lower sector will close. In one illustrated example (FIG. 7A), the movable cams 84 are pivoted to asymmetrically vector the FVAN 42 in a full "up" direction (also illustrated in the schematic of FIG. 5C and table of FIG. 5D). The movable cam 84 at the 0 degree position moves in a positive direction toward the engine axis A such that the flap linkage 52 moves forward (e.g., +5 units; link arrow L+) such that the flap assembly 48 pivots about the circumferential hinge line 74 in away from the engine centerline A (FIG. 7). Conversely, the movable cam 84 at the 180 degree position moves in a negative direction away from the engine axis A such that the flap linkage 52 moves aft (−5 units; link arrow L−) such that the flap assembly 48 pivots about the circumferential hinge line 74 toward the engine centerline A (FIG. 7). The movable cam 84 at the 90 degree position and 270 degree position do not pivot and remain along the movable baseline cam axis C such that flap linkage 52 does not move (0 units; link arrow L−) and the flap assembly 48 at 90 and 270 degrees remains in the baseline position. The movable cam 84 at intermediate positions (0-90; 90-180; 180-270; and 27-360 degree positions) move some intermediate incrementally increasing or decreasing number of units (FIGS. 5C, 5D and FIG. 7B) to define the circumference of the asymmetrically vectored FVAN 42.

It should be understood that "units" as utilized herein are provided only for explanatory purposes and the actual vectoring angle capability is defined by the normal cam profile 86N (FIG. 5B), while the actual symmetric vectoring angle capability is defined by the circumferential cam profile 86C.

That is, the flaps 50 at the 0 degree and 180 degree position are pivoted to a maximum "up" position, the flaps 50 at 90 degree and 270 degree position do not pivot while the flaps 50 in the lower hemi-circle progressively change in pivot position to the 90-180 degree line, while the flaps 50 in the upper hemi-circle progressively pivot (FIG. 7).

By adjusting the FVAN 42, engine thrust and fuel economy are maximized during each flight regime. Preferably, the actuator system 54 communicates with an engine controller or the like to optimally adjust the position of the FVAN 42. However, other control systems including flight control systems may likewise be usable with the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
a core structure defined about an axis;
a fan structure circumscribing said core structure, said fan structure having a fan variable area nozzle with at least one flap which at least partially defines a fan nozzle exit area between said fan structure and said core structure;
a cam drive ring;
a flap linkage pivotally mounted to said fan nacelle, said flap linkage mounted to said at least one flap and biased into contact with said cam drive ring at a follower; and
an actuator system capable of rotating said cam drive ring about said axis to vary said fan nozzle exit area defined by said fan variable area nozzle as said follower traverses said cam drive ring.

2. The engine as recited in claim 1, wherein said at least one flap includes a multiple of flaps defined about the fan nozzle exit area.

3. The engine as recited in claim 2, wherein said multiple of flaps define a trailing edge of said fan variable area nozzle.

4. The engine as recited in claim 3, wherein said cam drive ring includes a multiple of cams, each of said multiple of cams associated with one of said multiple of flaps.

5. The engine as recited in claim 1, wherein each said multiple of cams define a ramp profile.

6. The engine as recited in claim 1, wherein each of said multiple of cams define a serpentine profile.

7. The engine as recited in claim 1, wherein each said multiple of cams define a circumferential cam profile relative an engine axis a normal cam profile relative the engine axis, the circumferential cam profile transverse and contiguous with the normal cam profile such that said follow is movable thereover.

8. The engine as recited in claim 1, wherein each of said multiple of cams are pivotally mounted to said cam drive ring.

9. The engine as recited in claim 8, wherein each said multiple of cams define a circumferential cam profile relative an engine axis a normal cam profile relative the engine axis, the circumferential cam profile transverse and contiguous with the normal cam profile such that said follow is movable thereover.

10. The engine as recited in claim 1, wherein said follower includes a ball.

11. A gas turbine engine comprising:
a core engine defined about an axis;
a fan driven by said core engine about said axis;
a core structure defined at least partially about said core engine; and
a fan structure mounted around said fan and at least partially around said core structure, said fan structure having a fan variable area nozzle with a multiple of flaps which defines a fan nozzle exit area downstream of said fan between said fan structure and said core structure;
a cam drive ring which defines a multiple of cams;
a multiple of flap linkages pivotally mounted to said fan nacelle, each of said multiple of flap linkages mounted to at least one of said multiple of flaps and biased into contact with one of said multiple of cams at a follower; and
an actuator system capable of rotating said cam drive ring about said axis to vary said fan nozzle exit area defined by said fan variable area nozzle as each of said multiple of followers traverses one of said multiple of cams of said cam drive ring.

12. The engine as recited in claim 11, wherein said follower defines a point contact.

13. The engine as recited in claim 11, wherein each said multiple of cams are pivotally mounted to said cam drive ring.

14. The engine as recited in claim 13, wherein each said multiple of cams define a circumferential cam profile and a normal cam profile in contact with said follower.

15. The engine as recited in claim 13, further comprising a cam drive system which selectively pivots each of said multiple of cams independently of each other.

16. The engine as recited in claim 15, wherein said cam drive system includes an electromagnetic system.

17. The engine as recited in claim 15, wherein said cam drive system operates independent of said actuator system.

18. A method of varying a fan nozzle exit area comprising the steps of:
(A) biasing a flap linkage pivotally mounted to a fan nacelle into contact with a cam of a cam drive ring;
(B) rotating the cam drive ring about an engine axis; and
(C) following the cam with a follower of the flap linkage to symmetrically vary the fan nozzle exit area defined by said fan variable area nozzle as the follower traverses the cam.

19. A method as recited in claim 18, further comprising the step of:
(D) pivoting the cam relative the cam drive ring to vary the thrust vector.

* * * * *